May 25, 1965  H. B. STINSON, JR., ETAL  3,185,016
CHORD TEACHING DEVICE
Filed March 6, 1963
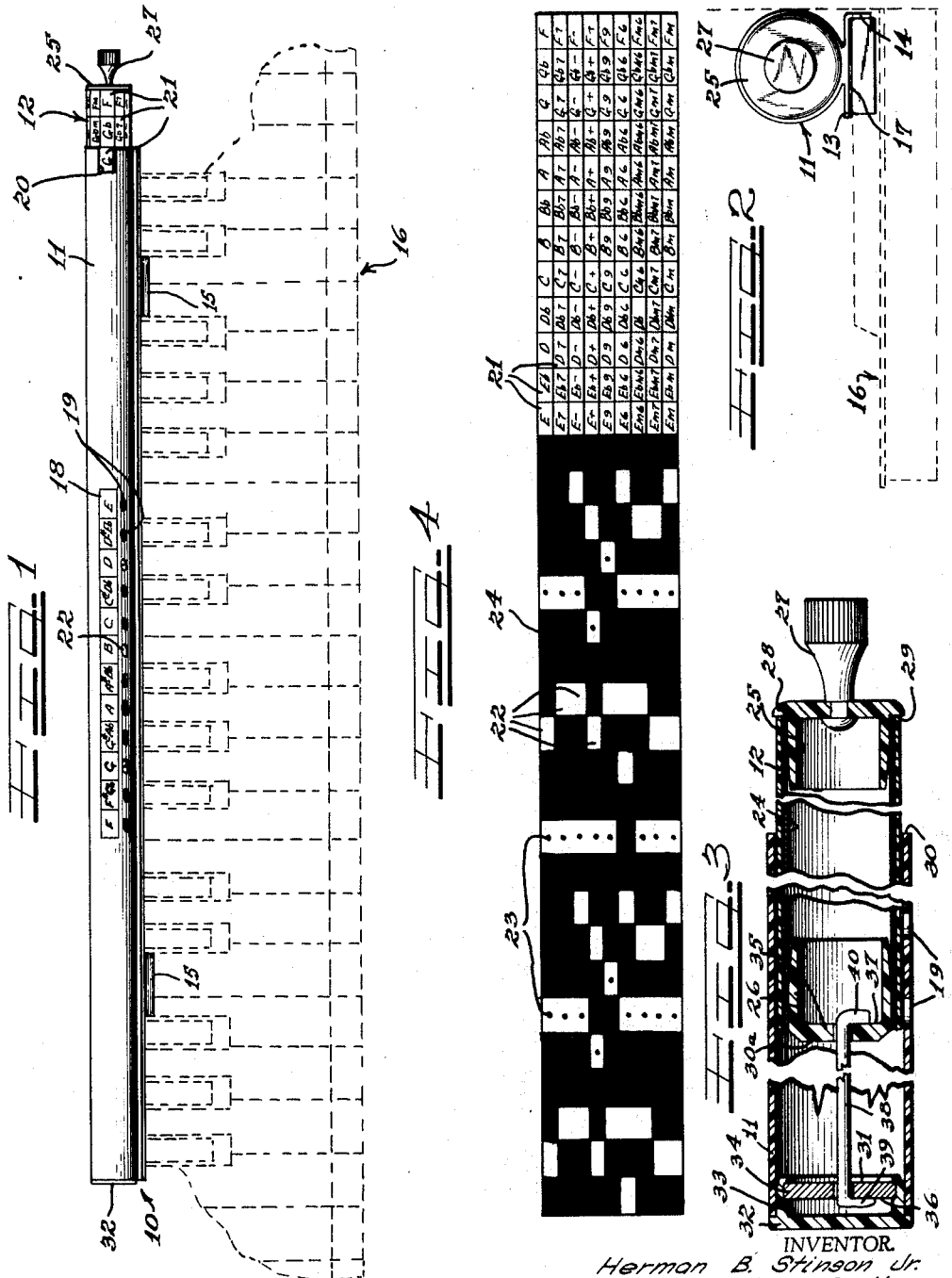
INVENTOR.
Herman B. Stinson Jr.
Ivor Q. Noon
BY
Hill, Sherman, Meroni, Gross & Simpson
ATTORNEYS

United States Patent Office 3,185,016
Patented May 25, 1965

3,185,016
CHORD TEACHING DEVICE
Herman B. Stinson, Jr., Kirkwood, and Ivor G. Noon, St. Louis, Mo., assignors of twenty percent to William H. Magidson, University City, Mo.
Filed Mar. 6, 1963, Ser. No. 263,267
11 Claims. (Cl. 84—478)

This invention relates generally to teaching devices, and more specifically to a chord teaching device for a musical keyboard.

Although the principles of the present invention may be included in various teaching devices, a particularly useful application is made when the same are embodied in a chord teaching device which is constructed to rest directly on the black keys of a keyboard of the organ or piano type. Music is frequently written as a single melody line in the treble clef, above which the harmony to be included is indicated by a series of chord symbols. For example, if an accompaniment chord comprising the notes A, C, E, and G is to be called for, such comprises a chord known as "A minor 7th." In the music, this is further abbreviated to "Am7." Teaching aids or devices for instructing in the use and interpretation of such chord method or notation has been cumbersome, and the chances for error in understanding the same have been relatively high.

The present invention contemplates the utilization of a chord teaching device which is adapted to be disposed immediately adjacent to the keys and to provide means for immediately indicating the notes in any desired chord, such indication being provided directly adjacent to the keys to be played.

Accordingly, it is an object of the present invention to provide a novel teaching device.

A further object of the present invention is to provide a teaching device which is constructed to teach the user how to form chords by indicating notes to be played.

Another object of the present invention is to provide means for greatly simplifying the process of learning accompaniment chords on musical instruments having keyboards of the pianoforte type.

Yet another object of the present invention is to provide a chord teaching device which indicates directly the keys to be played to provide the notes in a selected accompaniment chord, such indication being accomplished immediately adjacent to the indicated keys.

Many other advantages, features and additional objects of the present invention will become manifest to those versed in the art upon making reference to the detailed descripion and the accompanying sheet of drawings in which a preferred structural embodiment incorporating the principles of the present invention is shown by way of illustrative example.

On the drawings:

FIGURE 1 is a front perspective view of a chord teaching device provided in accordance with the principles of the present invention;

FIGURE 2 is an end elevational view, slightly enlarged, of the structure shown in FIGURE 1;

FIGURE 3 is an enlarged cross-sectional view, partly broken away, of the device shown in FIGURE 1; and FIGURE 4 is a developmental view of indicia means disposed within the device.

As shown on the drawings:

The principles of this invention are particularly useful when embodied in a chord teaching device for a keyboard such as illustrated in FIGURE 1, generally indicated by the numeral 10. The teaching device 10 includes an outer case in the form of an opaque masking tubular member 11, an inner tube or member 12 slidably axially and rotatably supported within the tubular member 11, and having indicia thereon described below, and means coactive between the members 11 and 12, described in greater detail below, limiting the extent of axial movement of the inner member 12.

The tubular member 11 preferably comprises a rigid extrusion having an integrally formed cradle, stand, or base 13, which has a flange 14 extending downwardly and formed at a rear edge thereof. A pair of spacers 15, 15 are secured to the lower surface of the base 13, and are of such length as to be received between predetermined playing keys, as shown in FIGURE 1, to locate the device 10 with respect to a keyboard generally indicated at 16. The remainder of the lower surface of the base 13 preferably includes a felt strip 17 engageable with the black keys of the keyboard 16 to support the device 10 thereon as shown in FIGURE 2, with the flange 14 extending behind such keys. The tubular member 11 is provided with a strip 18, such as a decalcomania, on which appear designations corresponding to the name of the playing key on the keyboard 16 which is directly adjacent.

The device 10 includes reference means which, in this embodiment, are 12 in number, and comprise a series of 12 round indicator windows or holes 19, each one being disposed immediately adjacent to one of the playing keys, and thus immediately adjacent to the identifications appearing on the strip 18. As a practical matter, 12 such reference means or windows 19 are needed, although more may be included if desired, in which event the principles set forth herein would merely be extended by a desired amount. In each instance, the windows 19 are preferably spaced in the same spacing as that of the keys, and are preferably disposed immediately adjacent to a like number of consecutive keys. In that the spacer feet 15 are secured to the tubular member 11 and are received between appropriate black keys on the keyboard 16, the various reference means are thus supported in a fixed psition adjacent to the keyboard.

The tubular member 11 includes a further or additional window 20 in the form of a rectangular slot, the window 20 being shifted 40 degrees about the axis of the tubular member 11, with respect to the windows 19.

As best seen in FIGURE 1, the inner member 12 includes a series of identifier indicia 21, one of which is disposed within the rectangular window 20, and each of which is outlined by a rectangular line. The inner member 12 further includes a number or pattern of indicator indicia 22, three of which are respectively aligned with the G, B, and D windows in FIGURE 1.

The indicia 21 and 22 appear in fixed position on the inner member 12, and are shown in detail in a developmental form in FIGURE 4.

Referring to FIGURE 4, there is an identifier indicia 21 provided for each of nine different types of chords for each of 12 different keys, making 108 identifier indicia 21 in all, fixed to the inner member 12. Each of the identifier indicia 21 here comprises a chord name symbol. The symbol C is the symbol for a major triad chord. The symbol C7 is the symbol for a dominant 7th chord. The symbol C— is the symbol for the diminished chord. The symbol C+ is the symbol for an augmented chord. The symbol C9 is the symbol for a 9th chord. The symbol C6 is the symbol for a 6th chord, the symbol Cm7 is the symbol for a minor 7th chord. The symbol Cm is the symbol for a minor chord. Corresponding to each of the identifier indicia 21, there is an appropriate number of appropriately spaced indicator indicia 22, each in the form of a bright block or rectangle, and alignable with appropriate windows 19. Certain of the chords require that three of the indicator indicia 22 be aligned with windows to indicate the make-up of such chord. Other chords require four or five of the indicator indicia 22. The particular pattern shown in FIGURE 4 is particularly useful in that it includes all of the required bright rectangles, and equally important, none of the bright rectangles not required for a particular note appears at any other window. Thus, the tubular member 11, in co-operation with the arrangement of rectangles, effects appropriate masking of all rectangles which should be masked. Stated otherwise, the pattern is such that a dark rectangle or area appears at each window corresponding to the keys which should not be played for the indicated chord symbol.

Owing to the fact that the window 20 is offset one row from the position of the windows 19, the rectangles 22 in the left half of FIGURE 4, in any horizontal row, are those needed for the chord symbols in the next higher horizontal row.

For each chord, there appears further indicating means within two of the indicator indicia 22, such indicating means here comprising dark or black dots 23, two of which appear in FIGURE 1 at the G window and at the D window. The indicating means 23 or dots are used to indicate the root and 5th notes of the chord whose identifying symbol 21 is then appearing in the window 20. These indicating means 23 advise the organist that one or the other of these notes should be played in a lower octave, such as by foot on the pedal keyboard. The rectangular indicia 22 thus indicate the combinations of notes required to make the various chords identified by the identifier indicia 21.

The internal structure of the device 10 is further shown in FIGURE 3. The inner member 12 preferably comprises a transparent tube, such as of clear acetate, which telescopes into the tubular member 11. Within the tube, there is means disposed which has on it the radially outwardly directed indicia 21, 22. By way of example, in the present construction, there is provided a sheet of paper 24 rolled into tubular form, the outer surface of which carries the pattern shown in FIGURE 4. The thickness of the paper 24 has been exaggerated in FIGURE 3 for purpose of clarity of illustration.

To lock the tubularly arranged paper strip or sheet 24 in a fixed position, there is provided an end cap or plug 25 and a further end cap or plug 26, each being compressively yieldable to form a press fit within the opposite ends of the inner member 12. The plugs 25 and 26 have tapered lead-in ends to facilitate their assembly.

The plug 25 further includes a knob 27 by which the inner member 12 may be axially reciprocated or angularly rotated within the tubular member 11.

As stated above, the device 10 includes means coactive between the members 11 and 12 for limiting the extent of axial movement of the inner member 12. One such means comprises a shoulder or radial projection 28 on the plug 25, and defining an axially directed surface 29 which is engageable abuttingly with the adjacent end 30 of the tubular member 11. If desired, the plug 26 may be provided with a surface 30a which is axially directed and which is coactive with an oppositely directed surface 31 disposed at the corresponding end on the other member 12 to assist in or to act as the sole means for limiting inward axial movement of the tubular member 12.

To limit the outward axial movement of the tubular inner member 12, there is provided a further cap or plug 32 of compressively yieldable material which has a press fit with one end of the member 11, and including a tapered lead-in surface for facilitating the assembly thereof. The plug 32 has a central recess 33 which is counterbored and which receives an annular member 34. When the parts are disassembled, the annular member 34 slips freely into the recess 33. However, when the plug 32 is pressed into the tubular member 11, the outer periphery is compressed so that a tight grasp or grip is made on the outer periphery of the annular member 34 to hold the same in position as illustrated.

In a similar fashion, the plug 26 includes an annular member 35 supported by and integral with the plug 26 and defining the axially directed surface 30a.

The annular means or means 34 thus has a shoulder or surface 36 while the annular means 35 has a shoulder 37, the shoulders 36 and 37 being directed in opposite axial directions. An elongated stop member 38 slidably extends through the two annular members 34, 35, and at each end includes a hook 39, 40, respectively, engageable with the shoulders 36, 37 to limit the axial outward movement of the inner member 12.

By this structure, no separate fasteners are required and the end results desired are obtained in a particularly facile manner.

It is to be understood that the device 10 may be constructed and adapted for placement over any other group of consecutive keys.

Although various minor modifications might be suggested by those versed in the art, it should be understood that we wish to embody within the scope of the patent warranted hereon all such embodiments as reasonably and properly come within the scope of my contribution to the art.

We claim as our invention:

1. A chord teaching device for a keyboard, comprising in combination:
    (a) an outermost tubular member having means by which it may be supported adjacent to and against the keyboard in an axially and angularly locked position and having a series of 12 reference means aligned in a row therein, spaced along said member to be disposed respectively adjacent to 12 consecutive keys of the keyboard; and
    (b) an inner member movably disposed within and supported by said outermost tubular member and projecting at one end therefrom at all times, and having indicia fixed thereon, various combinations of which are selectively alignable with said reference means to indicate a group of keys to be played in combination.

2. A chord teaching device for a keyboard, comprising in combination:
    (a) an outermost tubular member having means by which it may be supported adjacent to and against the keyboard and having reference means thereon; and
    (b) an inner member disposed within said tubular member and having indicia thereon, said inner member being relatively movable with respect to said reference means to various positions in which a plurality of said indicia are aligned with said reference means to indicate a group of keys to be played in combination to form a musical chord, said inner member having further means fixed thereon and indicating which keys of said indicated group of keys comprise the root and fifth notes of said chord.

3. A chord teaching device for a keyboard, comprising in combination:
    (a) an outermost stationary tubular member having means by which it may be supported in an axially and angularly locked position adjacent to and against the keyboard, and having reference means thereon; and (b) a movable inner member disposed within said tubular member and projecting at one end thereof at all times, said inner member having indicia fixed thereon, said inner member being both slidable axially and rotatably to move said indicia to positions at which various combinations of said indicia are aligned with said reference means to indicate a group of keys to be played in combination.

4. A chord teaching device for a keyboard, comprising in combination:

(a) a tubular member having means by which it may be supported in an axially and angularly locked position adjacent to the keyboard, and having a series of 12 indicator windows aligned in a row therein, spaced along said member to be disposed respectively immediately adjacent to 12 consecutive keys of the keyboard, said member also having an additional window distinctively separated from said aligned windows; and (b) an inner member disposed within said tubular member and projecting at one end therefrom at all times, said inner member having indicator and identifier indicia fixed thereon, said inner member being selectively both slidable axially and rotatable to positions at which various combinations of a predetermined number of said indicator indicia are aligned with a like number of said indicator windows, and one of said identifier indicia is aligned with said additional window, to indicate a group of keys to be played in combination and comprising an identified musical chord, said inner member having further means fixed thereon and indicating which keys of said indicated group of keys comprise the root and fifth notes of said chord.

5. A teaching device, comprising in combination:

(a) an outermost stationary opaque tubular member having a series of no more than 12 windows per octave aligned in a single row therein and having means by which it may be supported in an axially and angularly locked position;

(b) an inner member movably disposed within said stationary tubular member, and having indicia fixed thereon, said inner member being selectively both slidable axially and rotatable to positions at which predetermined combinations of said indicia are aligned with said windows; and (c) means, coactive between said members, limiting the extent of maximum axial movement of said inner member.

6. A teaching device, comprising in combination:

(a) an opaque tubular member having a series of windows therein;

(b) an inner transparent tubular member disposed within said opaque tubular member, and being selectively both slidable axially and rotatable therein; and (c) means, having radially outwardly directed indicia, disposed within and fixed to said transparent tubular member, said indicia being arranged thereon in such manner that predetermined groups thereof are aligned with said windows for each of various positions of said transparent member.

7. A teaching device, comprising in combination:

(a) an opaque tubular member having a series of windows therein;

(b) an inner member disposed within said tubular member, and having indicia fixed thereon, said inner member being selectively both slidable axially and rotatable to positions at which predetermined combinations of said inidcia are aligned with said windows; and (c) a plug having a press fit with one end of one of said members, and having an axially directed portion coactive with an oppositely directed surface on the corresponding end on the other of said members to limit axial movement of said inner member.

8. A teaching device, comprising in combination:

(a) an opaque tubular member having a series of windows therein;

(b) an inner transparent tubular member disposed within said opaque tubular member, and being selectively both slidable axially and rotatable therein;

(c) tubularly arranged means, having radially outwardly directed indicia disposed within said transparent tubular member, said indicia being arranged thereon in such manner that predetermined groups thereof are aligned with said windows for each of various positions of said transparent member; and (d) compressively yieldable plug means received within said tubularly arranged means and urging said tubularly arranged means radially outwardly against the inner surface of said transparent tubular member to lock said tubularly arranged means in a fixed position therein.

9. A teaching device, comprising in combination:

(a) an opaque tubular member having a series of windows therein;

(b) an inner transparent tubular member disposed within said opaque tubular member, and being selectively both slidable axially and rotatable therein;

(c) tubularly arranged means, having radially outwardly directed indica disposed within said transparent tubular member, said indicia being arranged thereon in such manner that predetermined groups thereof are aligned with said windows for each of various positions of said transparent member; and (d) compressively yieldable plug means received within said tubularly arranged means and urging said tubularly arranged means radially outwardly against the inner surface of said transparent tubular member to lock said tubularly arranged means in a fixed position therein, said plug means having an axially directed portion coactive with an oppositely directed surface at an end of said opaque tubular member to limit axial movement of said inner member.

10. A teaching device, comprising in combination:

(a) an opaque tubular member having a series of windows therein;

(b) an inner member disposed within said tubular member, and having indicia fixed thereon, said inner member being selectively both slidable axially and rotatable to positions at which predetermined combinations of said indica are aligned with said windows;

(c) a pair of compressively yieldable plugs each having a press fit with one of corresponding ends of said members, and each supporting one of a pair of annular means defining oppositely axially directed shoulders; and (d) an elongated stop member slidably extending through said pair of annular means, and having a hook at each end engageable with the adjacent one of said shoulders to limit axial movement of said inner member.

11. A teaching device, comprising in combination:

(a) an opaque tubular member having a series of windows therein;

(b) an inner member disposed within said tubular member, and having indicia fixed thereon, said inner member being selectively both slidable axially and rotatable to positions at which predetermined combinations of said indicia are aligned with said windows;

(c) a pair of compressively yieldable plugs each having a press fit with one of corresponding ends of said members, and each supporting one of a pair of annular means defining oppositely axially directed shoulders, at least one of said annular means being a separate element held in a recess in the associated one of said plugs by radial compression of said plug; and (d) an elongated stop member slidably extending through said pair of annular means, and having a hook at each end engageable with the adjacent one of said shoulders to limit axial movement of said inner member.

References Cited by the Examiner

UNITED STATES PATENTS

| 793,053 | 6/05 | Clark | 84—482 |
|---|---|---|---|
| 801,469 | 10/05 | MacMaster | 84—478 X |
| 2,280,593 | 4/42 | Maffei | 84—480 |
| 2,517,026 | 8/50 | Quednau | 84—478 |
| 2,824,479 | 2/58 | De Rosa | 84—482 |
| 2,938,421 | 5/60 | Leonard | 84—480 |

LEO SMILOW, *Primary Examiner.*